(12) United States Patent
Wade

(10) Patent No.: US 11,653,080 B2
(45) Date of Patent: May 16, 2023

(54) OPTICAL MEMBER DRIVING DEVICE, CAMERA DEVICE AND ELECTRONIC APPARATUS

(71) Applicant: New Shicoh Motor Co., LTD, Zhejiang (CN)

(72) Inventor: Tatsuki Wade, Yamato (JP)

(73) Assignee: NEW SHICOH MOTOR CO., LTD, Zhejiang (CN)

( * ) Notice: Subject to any disclaimer, the term of this patent is extended or adjusted under 35 U.S.C. 154(b) by 0 days.

(21) Appl. No.: 17/459,315

(22) Filed: Aug. 27, 2021

(65) Prior Publication Data

US 2022/0070346 A1  Mar. 3, 2022

(30) Foreign Application Priority Data

Sep. 1, 2020  (CN) .......................... 202010905485.4

(51) Int. Cl.
| | | |
|---|---|---|
| H04N 23/57 | (2023.01) | |
| G02B 7/02 | (2021.01) | |
| G02B 7/09 | (2021.01) | |
| H04N 23/54 | (2023.01) | |
| H04N 23/68 | (2023.01) | |
| H04M 1/02 | (2006.01) | |
| H04N 23/55 | (2023.01) | |
| G02B 27/64 | (2006.01) | |
| G03B 5/00 | (2021.01) | |

(52) U.S. Cl.
CPC ............ *H04N 23/57* (2023.01); *G02B 7/023* (2013.01); *G02B 7/025* (2013.01); *G02B 7/09* (2013.01); *H04N 23/54* (2023.01); *H04N 23/687* (2023.01); *H04M 1/0264* (2013.01)

(58) Field of Classification Search
CPC .............. H04N 5/2257; H04N 5/2253; H04N 5/23287; H04N 5/2254; H04N 5/2328; H04N 23/57; H04N 23/54; H04N 23/687; H04N 23/55; G02B 7/023; G02B 7/025; G02B 7/09; G02B 27/646; G02B 7/02; H04M 1/0264; G03B 5/00
See application file for complete search history.

(56) References Cited

U.S. PATENT DOCUMENTS

| | | | |
|---|---|---|---|
| 2007/0058958 A1* | 3/2007 | Enomoto | G03B 5/00 396/55 |
| 2015/0370086 A1* | 12/2015 | Hamada | H04N 5/2253 359/557 |
| 2021/0195073 A1* | 6/2021 | Saito | H04N 5/2253 |

* cited by examiner

*Primary Examiner* — Albert H Cutler
(74) *Attorney, Agent, or Firm* — Hayes Soloway PC

(57) ABSTRACT

An optical member driving device is provided. The device includes a fixed portion with an accommodation space for accommodating a lens device and a movable portion which includes a holding portion for holding an image sensor and is supported by a suspension wire at a position on a rear side of the lens device. The fixed portion has a case surrounding a periphery of the movable portion, and the movable portion has a coil substrate on which a coil is formed. The coil substrate has a main body portion and stopper portions projecting outward from a circumference of the main body portion, and the stopper portions are directly opposed to an inner surface of the case.

6 Claims, 9 Drawing Sheets

OPTICAL MEMBER DRIVING DEVICE, CAMERA DEVICE AND ELECTRONIC APPARATUS

CROSS-REFERENCE TO RELATED APPLICATION

This application claims the benefit of Chinese patent application CN202010905485.4, filed on Sep. 1, 2020, the contents of which are incorporated by reference herein.

TECHNICAL FIELD

The present disclosure relates to an optical member driving device used in electronic apparatus such as smartphones, a camera device, and an electronic apparatus.

BACKGROUND

A camera device with a sensor shift OIS (Optical Image Stabilizer) function includes a fixed portion with a lens device and a movable portion with an image sensor, and drives the movable portion in a direction orthogonal to the optical axis of the lens device in the fixed portion or around the optical axis.

FIG. 9 is a diagram showing an example of a configuration of this type of conventional camera device. This camera device has an AF motor 810 which is a lens device, a case 820, support plate springs 830, a holder 840, a plate 850, magnets 860, suspension wires 870, a coil substrate 880, an FPC 890, an image sensor 900, a sensor substrate 910, a frame body 920, and a bottom board 930. The AF motor 810, the case 820, the holder 840, the plate 850, the magnets 860, the frame body 920, and the bottom board 930 constitute a fixed portion. The coil substrate 880, the FPC 890, the image sensor 900, and the sensor substrate 910 constitute a movable portion. The support plate springs 830 and the suspension wires 870 support the movable portion with respect to the fixed portion.

In this camera device, the FPC 890 is attached on the rear side of the coil substrate 880, and is bent to the front side to form a box shape. The movable portion moves in the X direction or the Y direction when current is supplied to coil of the coil substrate 880.

However, in this type of conventional camera device, when the movable portion moves in the X direction or the Y direction, the circumferential portion of the coil substrate comes into contact with the FPC, and there is a problem that the smooth movement of the movable portion is hindered.

SUMMARY

One of objects of the present disclosure is to provide an optical member driving device with a movable portion capable of moving smoothly, a camera device and an electronic apparatus.

In accordance with a first aspect of the present disclosure, there is provided an optical member driving device including: a fixed portion with an accommodation space for accommodating a lens device; a movable portion which includes a holding portion for holding an image sensor and is supported by a suspension wire at a position on a rear side of the lens device. The fixed portion has a case surrounding a periphery of the movable portion, the movable portion has a coil substrate on which a coil is formed. The coil substrate has a main body portion and stopper portions projecting outward from a circumference of the main body portion, and the stopper portions are directly opposed to an inner surface of the case.

In accordance with a second aspect of the present disclosure, there is provided a camera device including the optical member driving device described above.

In accordance with a third aspect of the present disclosure, there is provided an electronic apparatus including the camera device described above.

DETAILED DESCRIPTION

Figure 1:
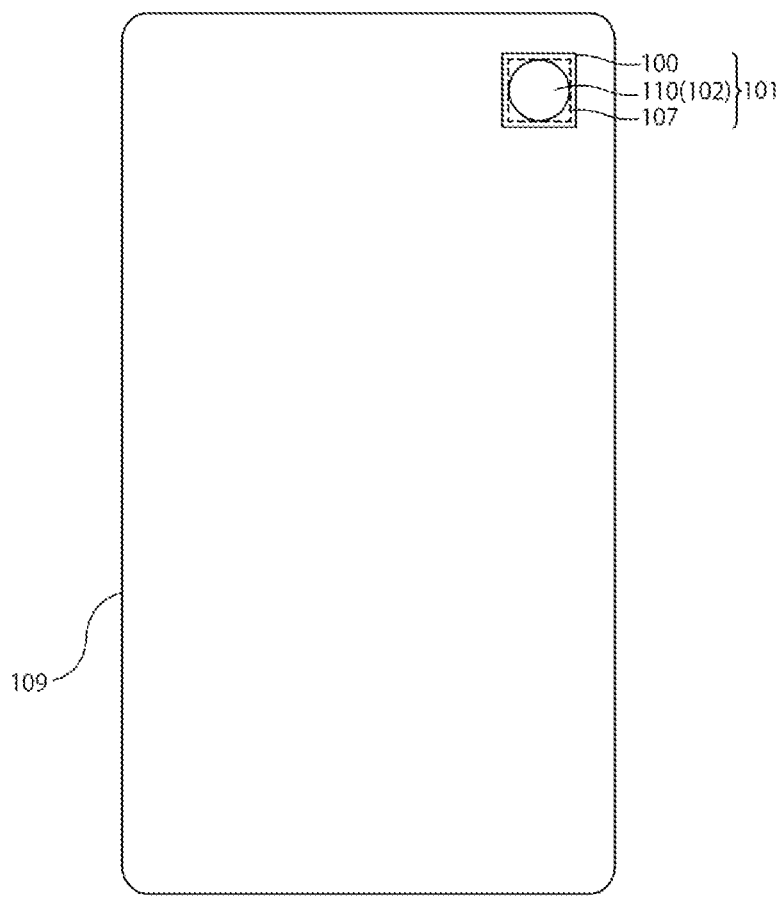
FIG. 1 is a front view of a smartphone on which a camera device is mounted, the camera device including an optical member driving device according to an embodiment of the present disclosure.

As shown in FIG. 1, a camera device 101 including an optical member driving device 100 according to one embodiment of the present disclosure is accommodated in a housing of a smartphone 109. The camera device 101 has an AF (Auto Focus) motor 102 as a lens device, an image sensor 107 as an optical member, and the optical member driving device 100. The AF motor 102 has a lens body 110, and an actuator driving the lens body 110 in a direction parallel to the optical axis of the lens body 110. The image sensor 107 converts the light guided via the lens body 110 into an image signal and outputs the image signal. The optical member driving device 100 fixes the AF motor 102 and the image sensor 107, and drives the image sensor 107 in a direction orthogonal to the optical axis of the lens body 110 of the AF motor 102 and in a direction rotating around the optical axis. As the lens device, it is not necessary to have an actuator that drives in a direction parallel to the optical axis of the lens body 110.

Hereinafter, an optical axis direction of lens body 11 is appropriately referred to as a Z-direction, one direction orthogonal to the Z-direction is appropriately referred to as an X-direction, and a direction orthogonal to both the Z-direction and the X-direction is appropriately referred to as a Y-direction. A+Z side, which is the side of the subject viewed from the lens body 110, may be referred to as a front side, and a−Z side, which is the opposite side (image sensor 107 side), may be referred to as a rear side.

Figure 3:
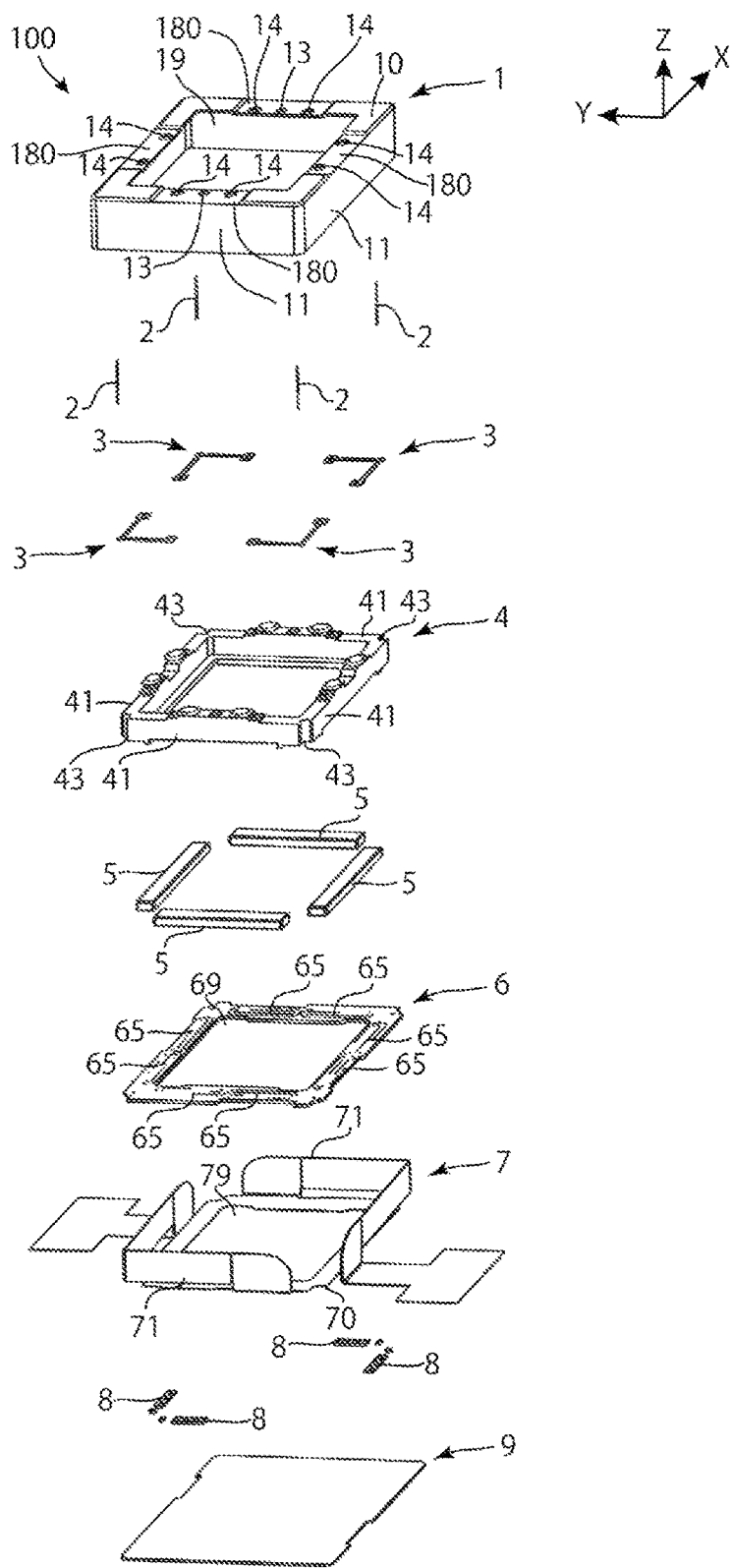
FIG. 3 is an exploded perspective view of the optical member driving device of FIG. 2.

As shown in FIG. 3, the optical member driving device 100 has a case 1, four suspension wires 2, four support plate springs 3, a holder 4, four magnets 5, a coil substrate 6, an FPC (Flexible printed circuits) 7, four driver ICs 8, and a bottom board 9. Among these members, the case 1 and the bottom board 9 are combined as a housing, and the suspension wires 2, the support plate springs 3, the holder 4, the magnets 5, the coil substrate 6, the FPC 7, and the driver ICs 8 are accommodated in this housing.

The case 1, the bottom board 9, the holder 4, and the magnets 5 constitute a fixed portion, and the coil substrate 6, the FPC 7, and the driver ICs 8 constitute a movable portion. The support plate springs 3 and the suspension wires 2 connect the fixed portion and the movable portion and support the movable portion. The AF motor 102 is accommodated and fixed in an accommodation space formed by a frame-shaped holder 4 constituting the fixed portion. The image sensor 107 is placed on a sensor substrate (not shown) and the sensor substrate is fixed to the rear surface of the FPC 7. The rear surface of the FPC 7 corresponds to a holding portion that holds the image sensor 107.

Figure 6:
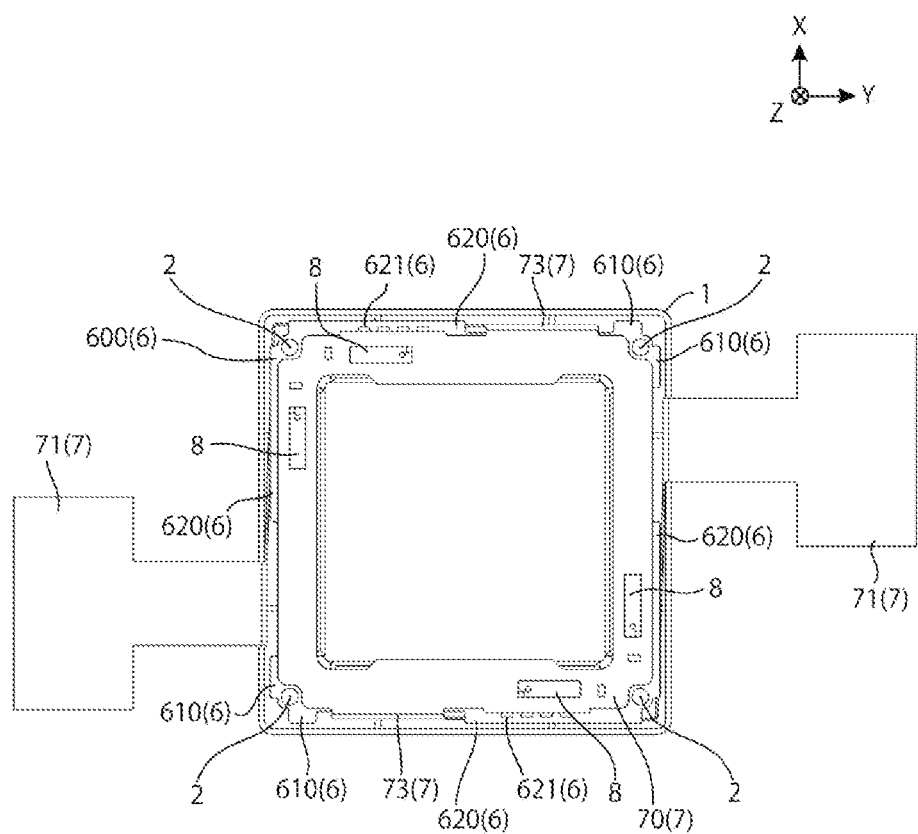
FIG. 6 is a bottom view in which the bottom board is removed from the optical member driving device of FIG. 2.

As shown in FIG. 6, the coil substrate 6 has a main body portion 600, first stopper portions 610 and second stopper portions 620 that protrude outward from the circumference of the main body portion 600. A rectangular through hole 69 is provided in the center of the main body portion 600 of the coil substrate 6, and both the outer shape and the inner shape thereof have a quadrangular annular shape. Two coils 65 are provided on each side portion of the quadrangle of the main body portion 600. The FPC 7 is formed by bending one point-symmetrical thin plate into a three-dimensional shape. The FPC 7 has a main body portion 70 and two connecting portions 71 arranged point-symmetrically. A rectangular through hole 79 is provided in the center of the main body portion 70 of the FPC 7, and both the outer shape and the inner shape thereof have a quadrangular annular shape. The coil substrate 6 is fixed to the front surface of the main body portion 70.

Figure 4:
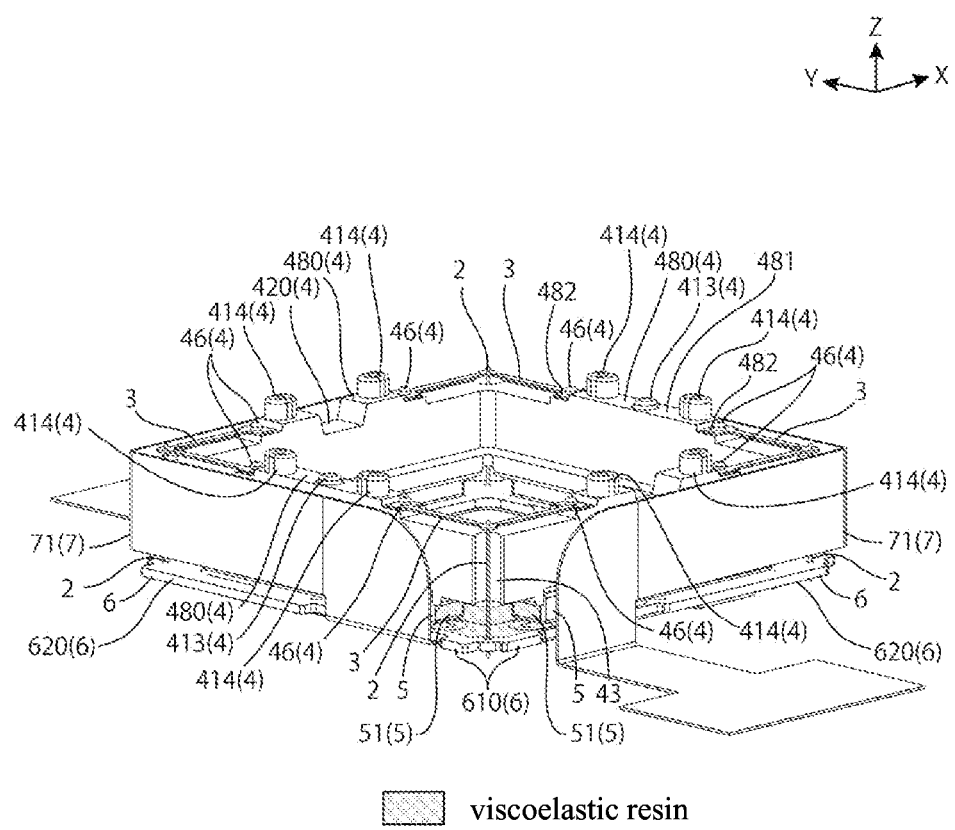
FIG. 4 is a perspective view in which the case and the bottom board are removed from FIG. 2.
Figure 7:
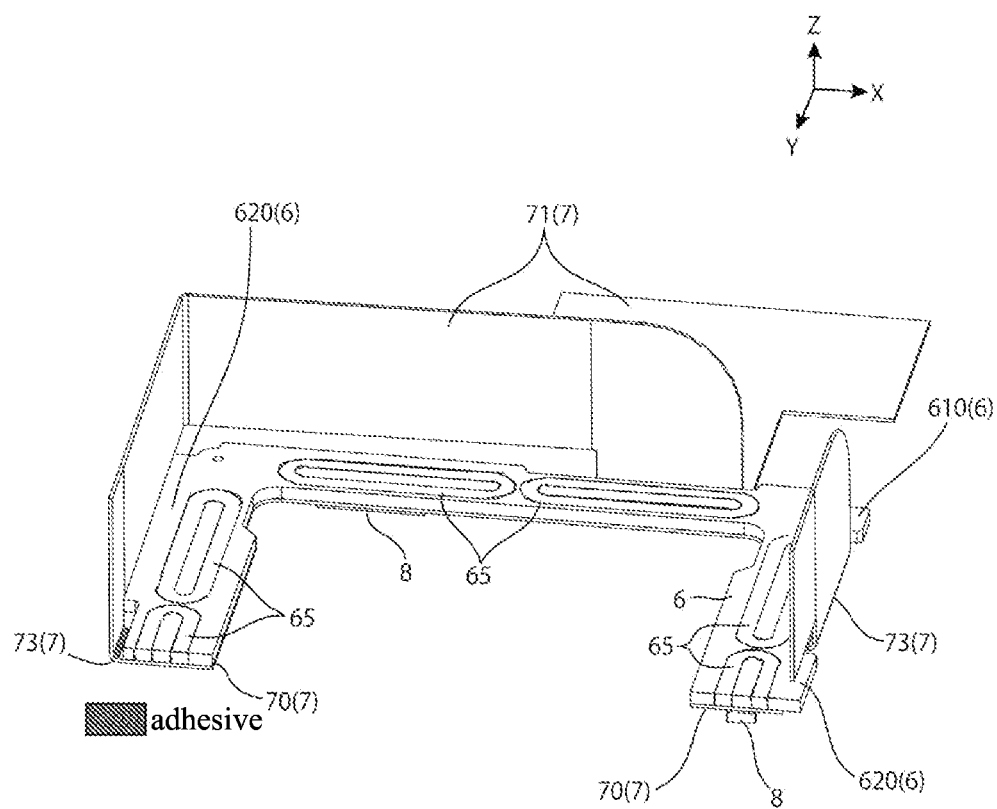
FIG. 7 is a cross-sectional perspective view in which only the coil substrate and the FPC are left from FIG. 2.

As shown in FIG. 7, in the two connecting portions 71 of the FPC 7, the base end portions 73 rise to the front side from predetermined positions of the side portions on the +X side and the −X side of the main body portion 70. The base end portion 73 where the connecting portion 71 of the FPC 7 rises is opposed to the side surface of the main body portion 600 of the coil substrate 6 and an adhesive is interposed therebetween. That is, the base end portion 73 is adhered and fixed to the coil substrate 6 with the adhesive. This adhesive may be squeezed out to the front side from the gap between the base end portion 73 of the FPC 7 and the circumference of the coil substrate 6. This predetermined position is a position close to one corner portion of predetermined diagonal corners, and the predetermined diagonal corners are a corner portion on the +X+Y side and a corner portion on the −X−Y side. The connecting portion 71 extends along each side portion toward the side opposite to the predetermined diagonal corner, and when it reaches the corner portion with the adjacent side portion, it extends along this adjacent side portion and falls to the rear side at a predetermined position. This predetermined position is a position close to the other corner portion of the predetermined diagonal corners. The connecting portion 71 that fell to the rear side is bent toward the outside in the Y direction at the same height as the bottom board 9 and projects to the outside of the case 1 through the gap between the rear edge of the case 1 and the bottom board 9. In this way, the FPC 7 covers the outside of the holder 4 except for the predetermined diagonal portions. As shown in FIG. 4, the rear edge of the portion extending along the two side portions of the connecting portion 71 is entirely in front of the coil substrate 6.

The connecting portion 71 has a T-shaped tip end at a portion projecting to the outside of the case 1, and a plurality of connecting terminals are provided on the rear surface of this T-shaped portion. Each side portion of the quadrangle of the main body portion 70 is provided with a driver IC 8. The driver IC 8 is fixed to the rear surface of the FPC 7 at a position directly behind the coil 65 of each side portion closer to the predetermined diagonal corner of the quadrangle. Further, the sensor substrate to which the image sensor 107 is attached is attached to the rear surface of the main body portion 70, and the light receiving surface of the image sensor 107 is exposed forward from the through hole 79. The coil 65 and the image sensor 107 are electrically connected to the main body of the smartphone 109 via the FPC 7.

As described above, the first stopper portions 610 and the second stopper portions 620 are provided so as to project outward from the circumference of each side portion of the main body portion 600 of the coil substrate 6. Each of the first stopper portions 610 and the second stopper portions 620 is directly opposed to the inner surface of the case 1. Conversely, the base end portions 73 of the connecting portions 71 of the FPC 7 and the portions where the connecting portions 71 fall are between the outer peripheral surface of the main body portion 600 of the coil substrate 6 and the inner surface of the case 1. The two stopper portions 610, 620 project outward from positions where the FPC 7 does not exist on the outer periphery. The base end portions 73 are opposed to the side surface of the main body portion 600 of the coil substrate 6, and are located inside the outside ends of the two stopper portions 610, 620. The first stopper portion 610 is provided in an area between the other diagonal corner that is not the predetermined diagonal corner and the front side where the FPC 7 exists on the outer periphery, and the second stopper portion 620 is provided in an area between the predetermined diagonal corner and the front side where the FPC 7 exists on the outer periphery. When the movable portion moves in the XY direction and rotates around the Z axis, the first stopper portions 610 and the second stopper portions 620 abut the inner surface of the case 1 prior to any other portions of the movable portion. To ensure the movement, the first stopper portions 610 and the second stopper portions 620 are desirably provided in the vicinity of the corner portions. The functions of the first stopper portions 610 and the second stopper portions 620 as stoppers can be exerted by only one of them. However, by adopting a structure in which the base end portion 73 of the FPC 7 is sandwiched between the first stopper portions 610 and the second stopper portions 620, it is possible to prevent the base end portion 73 from abutting against the inner surface of the case 1 prior to the first stopper portions 610 and the second stopper portions 620 during the movement. Further, an electrical connection portion 621 electrically connected to the main body portion 70 of the FPC 7 is provided on the rear surface of the second stopper portion 620.

The holder 4 is a quadrangular frame-shape body when viewed in the Z direction and has two pairs of wall portions 41 opposed to each other in the X direction and the Y direction. There are notches 43 inwardly cut in a quarter arc shape on the outer surface of the corners where the wall portions 41 intersect. On the front surface of the wall portion 41, there is provided a stand portion 480 protruding to the front side in two steps from the corner portion toward the center of the side portion. The stand portion 480 has a central foremost surface 481 and middle step surfaces 482 on both sides thereof.

A positioning protrusion 413 is provided in the center of the foremost surface 481 of the stand portion 480 of the wall portion 41 opposed to the X direction, and two protruding portions 414 are provided on both sides of the positioning protrusion 413 in the Y direction. The positioning protrusion 413 directly rises from a groove formed around it in an annular shape. The foremost surface 481 of the stand portion 480 of the wall portion 41 opposed to the Y direction is divided on both sides with a central recess 420 in between, and two protruding portions 414 are provided on both sides of the recess 420 in the X direction. Further, small protrusions 46 are provided on eight middle step surfaces 482 of the stand portions 480 of the wall portion 41, respectively.

Figure 2:
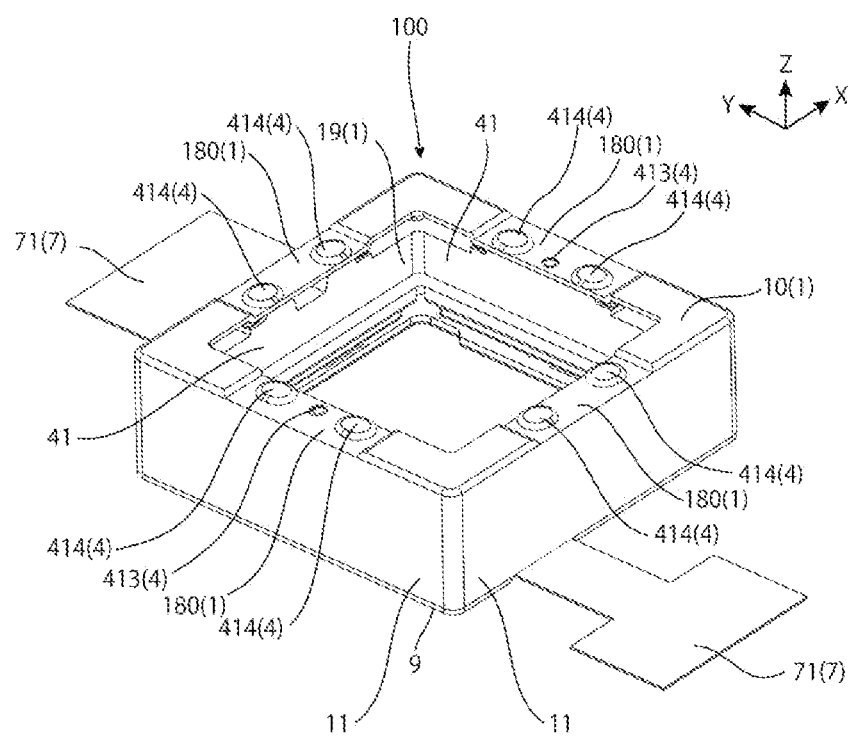
FIG. 2 is a perspective view of the optical member driving device of FIG. 1.

As shown in FIG. 2, the holder 4 is covered by the case 1. The case 1 has a box shape, and has a quadrangular front board 10 when viewed from the Z direction and side boards 11 extending rearward from respective edges of the front board 10. A rectangular through hole 19 is provided in the center of the front board 10 covering the front side of the holder 4 in the case 1. The shape and size of the through hole 19 are substantially the same as the shape and size of the inner shape of the wall portion 41 of the holder 4. When the AF motor 102 is accommodated in the holder 4, the front side of the AF motor 102 is exposed from the through hole 19. A recessed portion 180 recessed rearward at a position in the center of each side portion of the quadrangle is provided in the front board 10. Each recessed portion 180 are provided with two through holes 14 along the side portion. The recessed portions 180 on the +X side and the −X side are each further provided with a positioning hole 13, and the positioning hole 13 is located in the middle of the two through holes 14.

Figure 5:
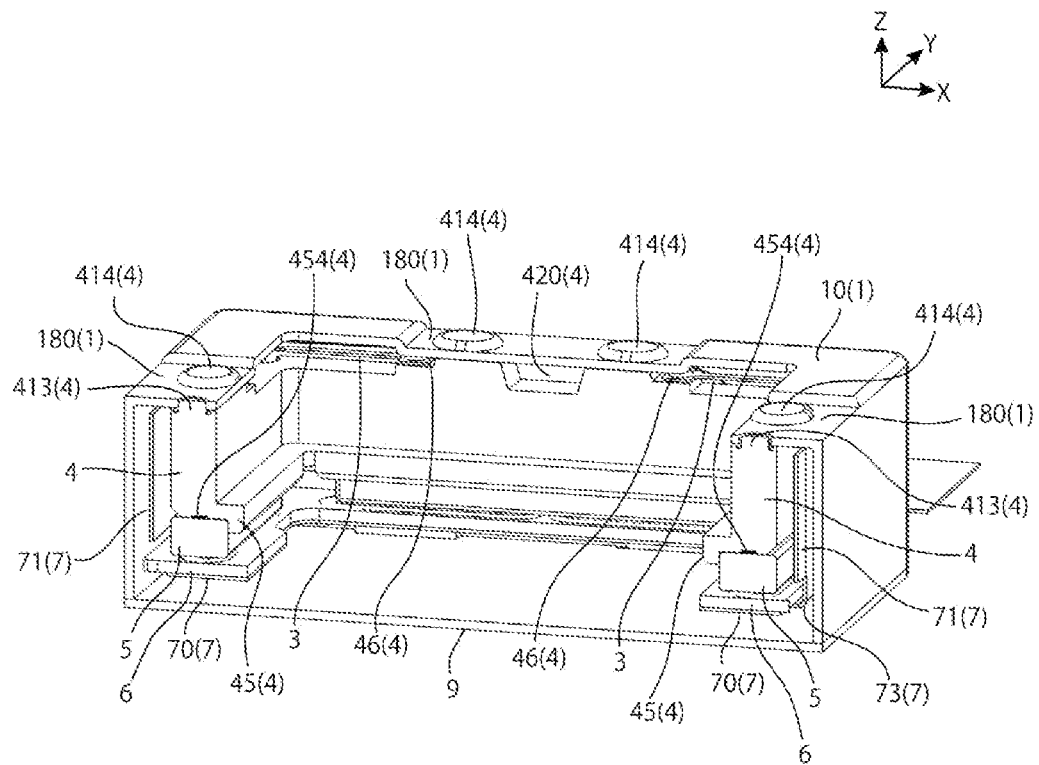
FIG. 5 is a cross-sectional perspective view of the optical member driving device of FIG. 2.

The positioning protrusion 413 of the holder 4 is fitted into the positioning hole 13 of the front board 10 of the case 1. At that time, the stand portion 480 and the rear surface of the recessed portion 180 abut against each other, and the rear surface of the recessed portion 180 is less likely to float with respect to the stand portion 480 due to the groove around the positioning protrusion 413. The protruding portion 414 of the holder 4 is inserted into the through hole 14 of the front board 10 of the case 1, and is fixed by thermal caulking. As shown in FIG. 5, since the width of the protruding portion 414 is wider than the width of the through hole 14 on the front side of the through hole 14 in the protruding portion 414, the holder 4 is less likely to be separated from the case 1. The wide width corresponds to the large diameter when the cross section after thermal caulking is circular. In addition, the front end of the protruding portion 414 is located behind the front board 10 of the portion adjacent to the recessed portion 180.

Figure 8:
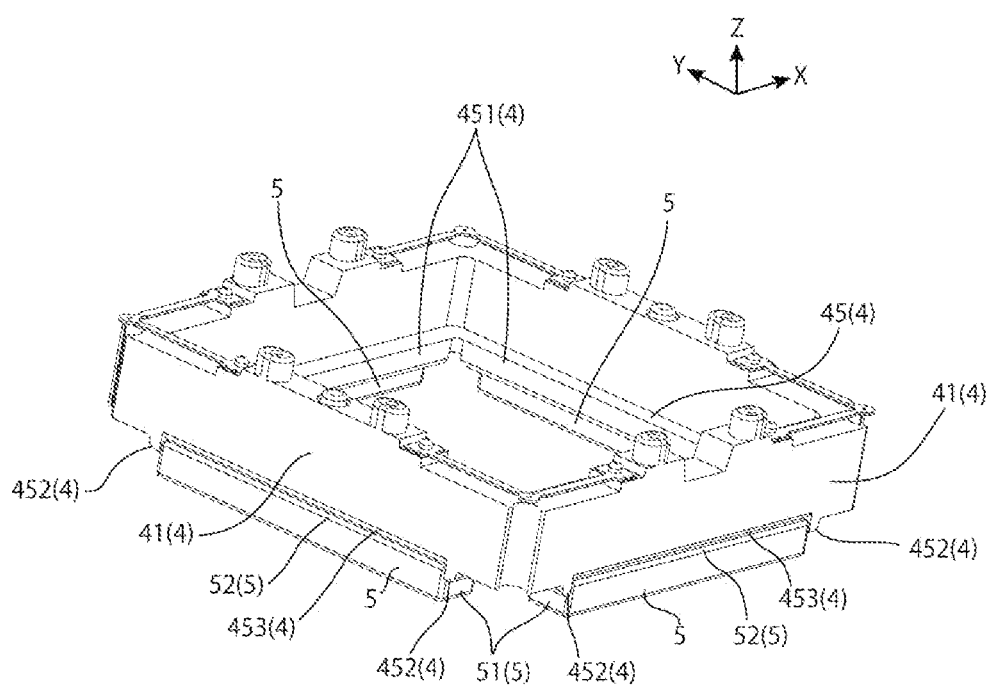
FIG. 8 is a perspective view in which only the holder and the magnets are left from FIG. 2.
Figure 9:
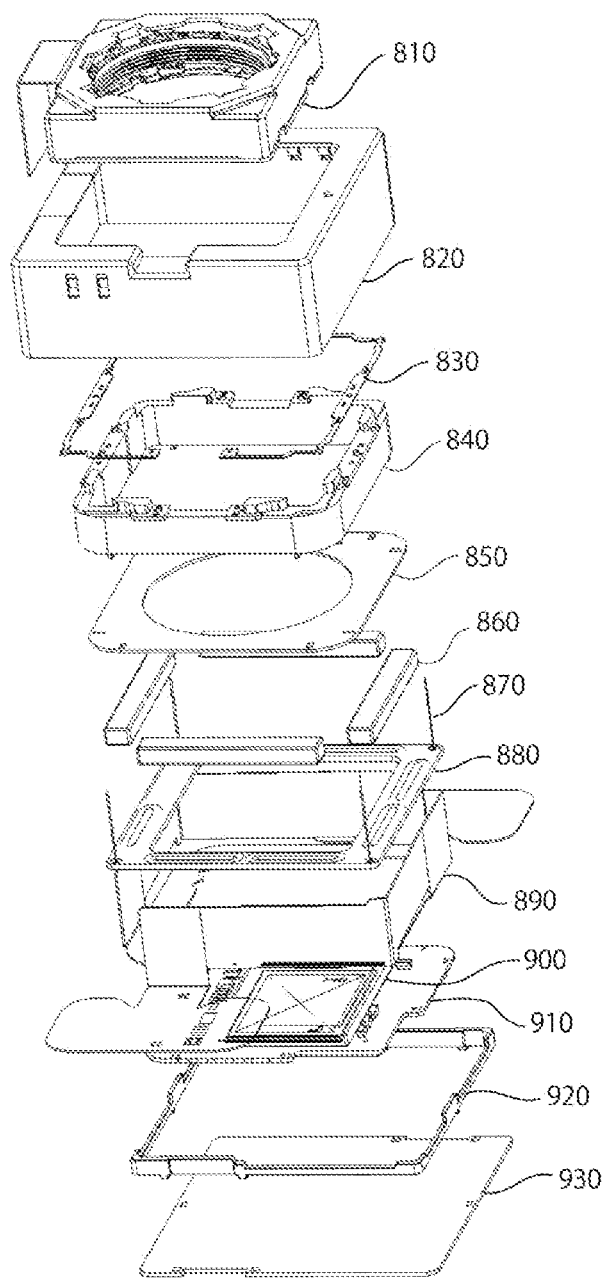
FIG. 9 is an exploded perspective view of a conventional camera device.

As shown in FIG. 4 and FIG. 8, an eaves portion 45 is provided on the inner surface of the wall portion 41 of the holder 4. The eaves portion 45 projects inward from the rear end of the inner surface of the wall portion 41 and is provided with a first projecting portion that projects rearward from the inner end of the eaves portion 45. The AF motor 102 is accommodated in a space surrounded by the inner surface of the wall portion 41 and the front surface of the eaves portion 45 in the holder 4. The outer surface of the AF motor 102 is adhesively fixed to the inner surface of the wall portion 41.

The rear surface of the wall portion 41 of the holder 4 adhesively fixes the front surface of the magnet 5. The magnet 5 has an elongated rectangular parallelepiped shape and is provided along the wall portion 41. There is a coil substrate 6 on the rear side of the magnet 5. The magnet 5 and the coil 65 on the coil substrate 6 are opposed to each other at an interval. It is desirable that the outer surface of the wall portion 41, which is also the outer surface of the holder 4, and the outer surface of the magnet 5 are parallel and flush with each other. The corner between the rear surface of the holder 4 which is the adhesion surface adhered to the magnet 5, and the outer surface is chamfered, and an inclined surface 453 is provided. In addition, the corner between the front surface which is the adhesion surface of the magnet 5 adhered to the holder 4, and the outer surface is chamfered, and an inclined surface 52 is provided. The adhesive between the wall portion 41 and the magnet 5 on the contact surfaces is squeezed to these chamfered portions to form an adhesive accumulation. That is, a sufficient amount of adhesive is supplied between the rear surface of the holder 4 and the front surface of the magnet 5, and the excess adhesive can be accommodated in the space formed by the two inclined surfaces 453 and 52. However, the adhesive should not be squeezed out beyond the outer surfaces of the holder 4 and the magnet 5. In addition, an adhesive is interposed between the surface facing the outside of the first projecting portion 451 and the inner surface of the magnet 5, and the magnet 5 is also adhesively fixed by the first projecting portion 451. In addition, the magnet 5 has two peripheral end surfaces 51 intersecting the front surface and the outer surface, and the holder 4 has two second projecting portions 452 projecting rearward from the rear surface and sandwiching the magnet 5. An adhesive is interposed between each peripheral end surface 51 and the opposing surface of the second projecting portion 452 opposed to the peripheral end surface 51, and the magnet 5 is also adhesively fixed by the second projecting portion 452. In addition, as shown in FIG. 5, a recessed groove 454, which is an adhesive receiving portion, recessed to the front side is provided at a position on the rear surface of the holder 4 where the magnet 5 is adhesively fixed.

The portion of the holder 4 excluding the corner portions on the +X+Y side and the −X−Y side is surrounded by the connecting portions 71 of the FPC 7. The corner portions of the holder 4 on the +X+Y side and the −X−Y side are exposed to the outside without being surrounded by the connecting portions 71.

As shown in FIG. 3 and FIG. 4, the support plate spring 3 has an approximately L-shape. Round holes are provided in the base end portion of the support plate spring 3 and tip end portions of the tips divided at a right angle and extending from the base end portion.

The tip end portion of the support plate spring 3 is fixed on the middle step surface 482 of the stand portion 480 of the holder 4. The small protrusion 46 of the middle step surface 482 of the stand portion 480 is fitted into the round hole of the tip end portion of the support plate spring 3. The base end portion of the support plate spring 3 is in a state of floating on the front side of the notch 43 of the holder 4. In the four corners of the coil substrate 6, there are round holes at positions corresponding to the round holes of the tip end portions of the support plate springs 3.

The suspension wire 2 passes through the notch 43 of the holder 4 and is suspended between the round hole of the base end portion of the support plate spring 3 and the round hole of the coil substrate 6. That is, the front ends of the suspension wires 2 are inserted and soldered in the round holes of the base end portions of the support plate springs 3, and the rear ends are inserted and soldered in the round holes of the four corners of the coil substrate 6. In addition, at each of the corner portions on the +X+Y side and the −X−Y side, which are the predetermined diagonal corners exposed from the FPC 7, the peripheral end surfaces 51 which are the side surfaces of the end portions of two magnets 5 facing the top of each corner portion constitute opposing surfaces opposed to each other at right angles. Each peripheral end surface 51 and the front surface, which is the surface facing the front side of the coil substrate 6 of the movable portion, are bridged by a resin having viscoelasticity. The resin with viscoelasticity used in this embodiment is, e.g., a so-called damper gel. The peripheral end surfaces 51 to be bridged include the peripheral end surface 51 of the magnet 5 on the +Y side facing the +X direction, the peripheral end surface 51 of the magnet 5 on the −Y side facing the −X direction, the peripheral end surface 51 of the magnet 5 on the +X side facing the +Y direction, and the peripheral end surface 51 of the magnet 5 on the −X side facing the −Y direction. Therefore, the damping effect can be obtained for both the X direction and the Y direction.

The details of the configuration of the present embodiment have been described above. The optical member driving device 100 in the present embodiment includes: a fixed portion having an accommodation space for accommodating the AF motor 102 which is a lens device; and a movable portion that has a holding portion for holding the image sensor 107 and is supported at a position on the rear side of the AF motor 102 by the suspension wires 2. The fixed portion has a case 1 surrounding the periphery of the movable portion. The movable portion has a coil substrate 6 on which a coil 65 is formed. The coil substrate 6 has a main body portion 600 and stopper portions 610, 620 projecting outward from a circumference of the main body portion 600. The stopper portions 610, 620 are directly opposed to an inner surface of the case 1. Thus, since the stopper portions 610, 620 are directly opposed to the inner surface of the case 1 and there is nothing that hinders the movement of the movable portion, it is possible to provide an optical member driving device 100 in which the movable portion can move smoothly.

In addition, in the embodiment described above, the peripheral end surfaces 51 facing the corner portion on the +X−Y side and the corner portion on the −X−Y side and the front surface of the coil substrate 6 may not be bridged by the resin having viscoelasticity. In addition, it is not necessary that the peripheral end surfaces 51 are bridged, and for example, the surfaces of the second projecting portions 452 of the holder 4 facing the top of the corner portion may be bridged. In that case, the second projecting portions 452 may extend up to the rear side further than that shown in the figure. In addition, it is not necessary that the movable portion to be bridged is the coil substrate 6, and for example, the FPC 7 may be provided on the front side of the coil substrate 6 to bridge the FPC 7.

It is to be noted that, in the embodiment described above, it is not necessary to provide two protruding portions 414 of the holder 4 and two through holes 14 of the case 1 on each side portion of the through hole 19, and the protruding portions 414 of the holder 4 and the through holes 14 of the case 1 may be provided only on two opposing side portions, and one or three or more protruding portions 414 of the holder 4 and one or three or more through holes 14 of the case 1 may be provided on each side portion. In addition, in one pair of opposing side portions, it is desirable that the number of the protruding portions 414 in each side portion is the same, but the number of the protruding portions 414 may be different between different opposing side portions.

In addition, in the embodiment described above, the caulking fixing of the protruding portions 414 of the holder 4 to the through holes 14 of the case 1 and the adhesive may be used in combination, and the case 1 and the holder 4 may be adhered to each other with the adhesive. In that case, the adhesive may be interposed between the front surface of the holder 4 and the rear surface of the front board 10 of the case 1.

What is claimed is:

1. An optical member driving device, comprising:
   a fixed portion with an accommodation space for accommodating a lens device; and
   a movable portion comprising a holding portion for holding an image sensor, the movable portion being supported by a suspension wire at a position on a rear side of the lens device; wherein
   the fixed portion comprises a case surrounding a periphery of the movable portion,
   the movable portion comprises a coil substrate on which a coil is formed,
   the coil substrate comprises a main body portion and stopper portions projecting outward from a circumference of the main body portion, and
   the stopper portions are directly opposed to an inner surface of the case,
   wherein:
   the movable portion comprises a flexible printed circuits (FPC) comprising a main body portion connected to the image sensor and a connecting portion for connecting the main body portion and an external device,
   the connecting portion comprises a base end portion which rises from a predetermined position on an edge of the main body to a front side, and
   the base end portion is opposed to the main body portion of the coil substrate.

2. The optical member driving device according to claim 1, wherein the connecting portion rising to the front side extends along an edge on a front side of the coil substrate, and a rear end of the connecting portion is located closer to a front side than the coil substrate at a position where the stopper portion is located.

3. The optical member driving device according to claim 1, wherein the coil substrate comprises an electrical connection portion electrically connected to the flexible printed circuits (FPC) for supplying power to the coil, and the electrical connection portion is provided at the stopper portion on an outer side where the coil is arranged.

4. The optical member driving device according to claim 1, wherein the case is a rectangular parallelepiped box-shaped body, the coil substrate comprises four side portions parallel to the inner surface of the case, and the stopper portions are respectively provided at four side portions, and are located in the vicinity of a predetermined pair of diagonal corners.

5. A camera device comprising the optical member driving device according to claim 1.

6. An electronic apparatus comprising the camera device according to claim 5.

* * * * *